Patented Oct. 20, 1931

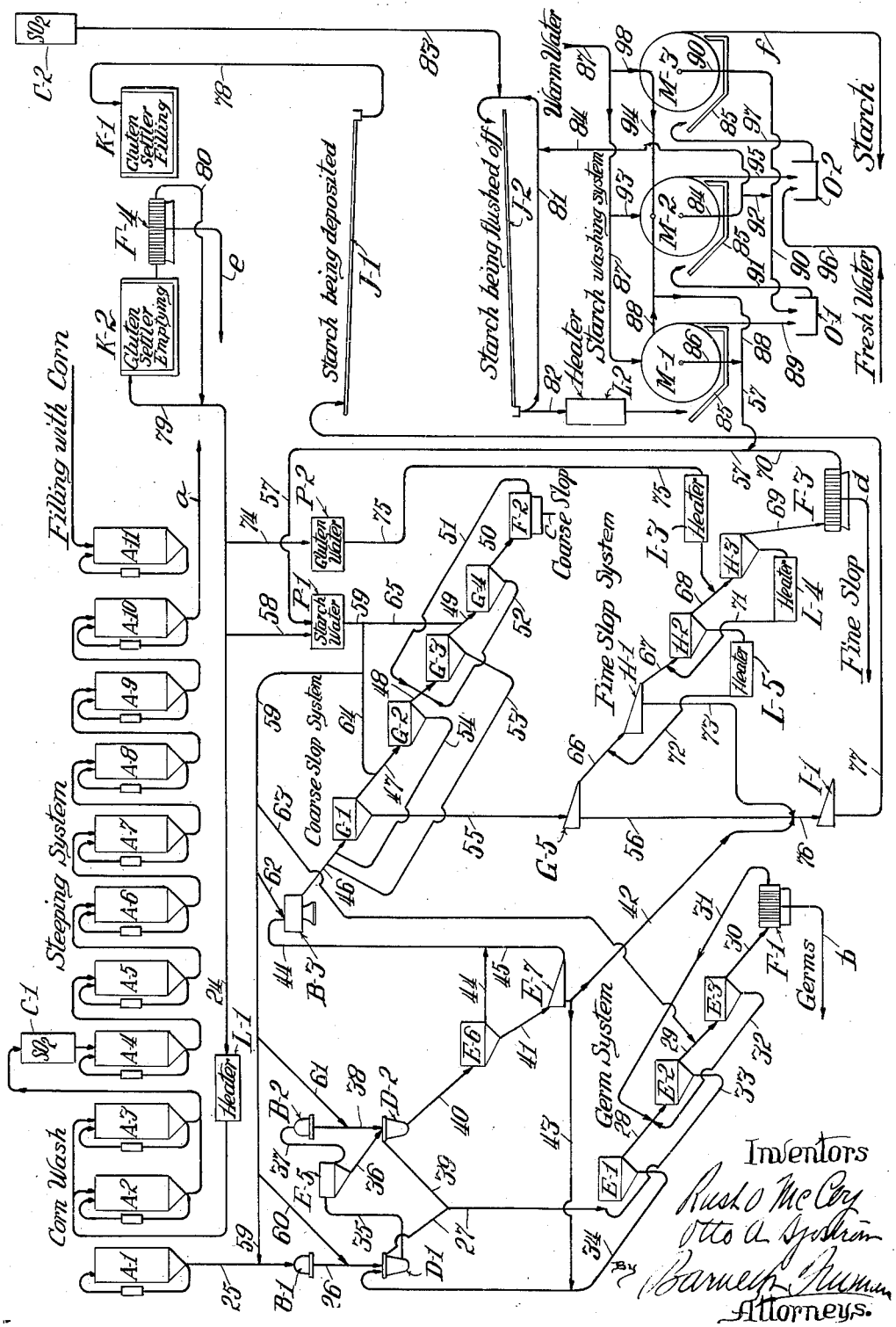

1,828,334

UNITED STATES PATENT OFFICE

RUSH O. McCOY, OF BERWYN, AND OTTO A. SJOSTROM, OF CHICAGO, ILLINOIS, ASSIGNORS TO INTERNATIONAL PATENTS DEVELOPMENT COMPANY, OF WILMINGTON, DELAWARE, A CORPORATION OF DELAWARE

METHOD OF MANUFACTURING STARCH

Application filed July 25, 1929. Serial No. 381,041.

This invention relates to the manufacture of starch by a process of the type involving the reuse in the system, repeatedly, of gluten water, that is, liquid from the starch tables, and the filtrates from the dehydrating and washing operations to which the starch taken from the starch tables is subjected for the purpose of removing soluble substances from the starch; the purpose of reusing these waste waters being to prevent stream pollution, save solid substances otherwise wasted and decrease the amount of water required for the separating and washing operations.

According to the present methods of making starch, particularly starch from Indian corn, the starch bearing material, the corn for example, after being steeped in warm water containing sulphurous acid (steeping system) is broken up and the germ separated from the rest of the material and washed (germ system); the rest of the material is finely ground and subjected to separating operations with water, containing sulphurous acid, in copper reels or on copper shaking screens to remove the coarser bran and fibre particles (coarse slop system); the liquid magma from the coarse slop system is subjected to a series of separating operations in silk reels or on silk shakers to remove the finer particles of bran and fibre (fine slop system); the liquid from the germ and coarse and fine slop systems is run over starch tables on which the starch settles and from which the water and gluten tails off into gluten settlers; and the starch on the tables is removed therefrom, either by flushing or other means, and is passed in a diluted condition through filtering devices in which the starch is first dehydrated to the extent to form cakes or layers and the cakes or layers washed with fresh water, this operation removing from the starch the soluble substances therein, at least to a large extent, and any other impurities which the starch may contain.

The water from the starch tables, preferably after the bulk of the gluten which it carries has been removed by settling in the gluten settlers (gluten water) and the water derived from the starch filtering operations, that is, from the dehydrating of the starch (first filtrate) and the subsequent washing of the starch cake or layer (second filtrate) is returned to the process for use in steeping the grain, in the mills for comminuting the grain and in the germ, coarse slop and fine slop systems; the milling and separating operations just mentioned constituting collectively what has been known as the "wet starch system."

It has been customary to give the tabled starch successive filtering operations in dehydrating and washing filters, returning the more concentrated filtrates to the wet starch system and employing the filtrates lighter in solubles for flushing the starch from the tables, thereby effecting a water balance in the system so that no substantial portion of any of the used liquors are sent to the sewer. See United States patent, Rush O. McCoy, No. 1,651,611, December 6, 1927.

It has also been the practice to control the amount of sulphurous acid entering the wet starch system with the corn from the steeping system by washing the steeped corn with returned gluten water, and to reuse gluten water in the germ and coarse slop systems and the filtrates from the starch washing operation in the fine slop system. See United States patent, G. M. Moffett, No. 1,655,395, Jan. 3, 1928.

It has long been customary to introduce sulphurous acid at various points, into the processes following the steeping of the grain, in addition to using the acid, in larger quantities, in the steeping system, the purpose being to check the growth of micro-organisms. It has also been customary to heat the liquids in process to whatever temperatures were deemed desirable for insuring proper drainage especially through the silk.

It may be said that improper drainage through the silk reels or shakers (whether those of the fine slop system or the silk screening devices used for clean-up purposes may occur in two distinct manners. In the first case there is a normal and, in fact, inevitable clogging of the silk, due to a gradual collection of particles from the finely ground corn residue, frequently mixed with cells of mycoderma yeast, which clogging may be termed "incrustation" and can be and has been retarded by "hosing off" the reels or shakers with water and by occasionally scrubbing them with alkaline or acid solutions, both practices having been customary for many years and being quite effective to keep the silk in proper condition as against "incrustation." In the second case of inefficient drainage, on the other hand, the clogging is of a much more serious nature. It is due to the formation of a slimy filamentous growth which adheres firmly to the silk fibers and cannot be effectively removed by the treatments that are sufficient as against the normal incrustation.

It has now been discovered that this slimy growth is due to fungi organisms belonging to or related to the oidium groups of fungi, the growth of which is possible only when the $SO_2$ concentrations in the system are relatively low.

On the basis of this discovery the present invention provides for an improved distribution of the returned liquids, facilitating the control of the process and making possible the use of smaller quantities of $SO_2$ whereby a saving of sulphur is effected and the inconveniences such as offensive smells in the factory, corrosion of metals and presence of metallic salts in the starch are avoided.

In accordance with the present invention the gluten water is reused primarily in the fine slop system, the excess, if any, going to the coarse slop or to the germ system or to both. The filtrates from the starch washing operations are returned to the germ and coarse slop systems. The gluten water, with a normal or even somewhat lower than normal amount of $SO_2$ in the system, will contain enough $SO_2$ so that it can be used advantageously for increasing the $SO_2$ content at the latter end of the wet starch system— the fine slop reels or shakers—where the $SO_2$ introduced with the steeped corn approaches depletion. Now, experience has shown that when gluten water is returned to the fine slop system, with its normal amount of $SO_2$, the process remains normal and no disturbances are experienced with sliming of the silks as mentioned in the second case of clogging. The use of gluten water at this point must therefore be considered beneficial and advantageous to the efficiency of the silk reels and shakers. This effect is due in part at least, and perhaps primarily, to the residual $SO_2$ in the liquid but it may be due perhaps in some measure also, to other factors such as the presence in the gluten water of products of micro-organic activity tending to inhibit the growth of the slime forming organisms. Whether this be so or not it seems to be the fact that the gluten water, in reference to sliming in the wet starch process, is a disinfecting, not an infecting agent.

The object of this invention is to take advantage of the discoveries indicated by utilizing gluten water for the separations carried on in the fine slop system.

The invention is illustrated in a preferred embodiment in the annexed flow sheet drawing in which the showing of the apparatus is simplified to the extent that single units only are illustrated in place of the multiplicity of units that would ordinarily be employed in a commercial plant. The drawing also omits pumps, control valves and the like which it is to be understood are used where required.

The process of the present invention will now be described in detail, reference being made to the accompanying drawing.

*Steeping system.*—The steeping system, consisting of a battery of steep tanks designated A—1 to A—11, is the same as described in Patent No. 1,655,395 above referred to and it will be sufficient to state that A—1 represents the steep tank from which the steeped and washed corn is being withdrawn for grinding; A—2, A—3, the tanks in which the steeped corn is being washed to reduce its $SO_2$ content before the corn is sent to the wet starch system, this step being optional depending upon the $SO_2$ concentrations in the steeps and those desired to be maintained at the first separators; A—4 to A—10 the tanks in which the corn is being steeped; and A—11 the one which is filling with fresh corn; C—1 designating the sulphur tower for charging the gluten water from tanks A—2, A—3 with $SO_2$ before the water enters the first steeping tank A—4, so as to maintain the $SO_2$ concentration in the steeps at the desired point, for example, 0.3%, based on the usual iodine titration method of computing $SO_2$. A pipe 24, containing heater L—1, brings the returned gluten water to tank A—2. The concentrated steep water from A—10 is discharged to the evaporator (not shown) through a pipe (outlet a).

*Germ system.*—The steeped corn discharged from tank A—1, through pipe 25 to the mill B—1, is there broken up and the germ freed. The material then goes through pipe 26 to separator D—1 in which the germs are separated from the grits and hulls by flotation. The germs floating off are passed through pipe 27 into germ reel E—1, then through pipe 28 to reel E—2, pipe 29 to reel E—3, and pipe 30 to the press F—1, the germs going out of the system at this point (outlet b) and the water from the press being returned to reel E—2 through pipe 31. The liquid from reel E—3 passes by pipe 32 to reel E—2, the liquid from E—2 by pipe 33 to reel E—1 and the liquid from E—1 by pipe 34 to the separator D—1. The hulls and grits from separator D—1 pass through pipe 35 to a reel E—5 the liquid from which goes by pipe 36 to a separator D—2. The tailings from reel E—5 pass through a pipe 37 to mill B—2 which discharges, by pipe 38, into the separator D—2. The germs from separator D—2 pass through pipe 39 to the pipe 27 and then to the reel E—1. The rest of the material from separator D—2 passes by pipe 40 to reel E—6 and the starch milk (starch and gluten) by pipe 41 to the shaker E—7, thence by a pipe 42 to the starch tables, as will be described, a portion of this liquid being diverted, where necessary to balance the system, through a pipe 43 to pipe 34. The tailings from reel E—6 and shaker E—7 pass through pipes 44, 45 to a mill B—3 in which this material is finely ground.

*Coarse slop system.*—The material ground in mill B—3 passes through pipe 46 to the first reel G—1 of the coarse slop system, then through pipe 47 to reel G—2, pipe 48 to reel G—3, pipe 49 to reel G—4, and pipe 50 to press F—2, the water from the press going back through pipe 51 to reel G—3. The pressed coarse slop is withdrawn from the system in moist condition (outlet *c*). The liquid from reel G—4 passes through pipe 52 to reel G—3; and the liquids from G—3 and G—2 pass by pipes 53, 54 to reel G—1. The liquid from reel G—1 passes by pipe 55 to a shaker G—5 and by pipe 56 to the starch tables.

Liquid for the mills, germ system and coarse slop system, just described, is supplied from a storage tank P—1 which receives filtrates from the starch washing system through pipe 57 and, through pipe 58, the excess of gluten water not used in the fine slop and steeping systems. A pipe 59 leads from the tank P—1 to the pipe 25, discharging into mill B—1. A branch 60 of pipe 59 connects with pipe 26 leading to separator D—1. Another branch 61 connects with the pipe 38 leading to separator D—2. Another branch 62 leads to mill B—3. Another branch 63 leads to the pipe 29, discharging into the germ reel E—3 and other branches 64 and 65 lead to the pipes 47 and 49 discharging into the coarse slop reels G—2, G—4.

The described connections may be varied as circumstances require and the term "pipes" is intended to cover troughs or other conduits. Shakers may be used in place of reels and vice versa.

*Fine slop system.*—The tailings from shaker G—5 pass by pipe 66 to shaker H—1, by pipe 67, to a shaker H—2; by pipe 68 to a shaker H—3, and by pipe 69 to a press F—3 from which the fine slop is discharged out of the system (outlet *d*). The water from the press passes through pipe 70 to pipe 57 and storage tank P—1. Liquid from reel H—3 passes by pipe 71 to reel H—2 and liquid from reel H—2 passes by pipe 72 to shaker H—1. The liquid from reel H—1 passes by pipe 73 to the starch tables.

The water used for making the fine slop separation is gluten water from gluten settler K—2 which enters the storage tank P—2 through pipe 74. Its $SO_2$ content should be sufficient to prevent any possibility of sliming and can be regulated in any suitable manner. If the amount of $SO_2$ for the steeped corn is such as to give too high an $SO_2$ concentration in the wet starch system, the corn in the steep tanks A—2, A—3 may be washed, as described to reduce the concentration at the first separator D—1 to whatever may be required, for example .07%. A pipe 75 conducts the gluten water from tank P—2 to the pipe 68, which discharges into the last of the fine slop reels, reel H—3. The pipe 75 might discharge directly into reel H—3 and the same is true of the other feed water connections throughout the system in respect to the reels or shakers which they supply.

It is possible to operate the system without heating the gluten water thus returned to the process for reuse; but in order to maintain the liquor passing through the silk reels or shakers of the fine slop system at customary temperatures and thus facilitate drainage it is desirable to warm the gluten water somewhat, which may be done either with a single heater or by use of a plurality of heaters as described in application of Frederick L. Jefferies, Serial No. 304,687 filed September 8, 1928. According to the latter arrangement a heater L—3 is placed in pipe 75 and booster heaters L—4 and L—5 are arranged in pipes 71 and 72.

*Tabling.*—The pipes 42, 56 and 73, through which starch milk (starch, gluten and water) is withdrawn from the germ system, the coarse slop system and the fine slop system unite in a pipe 76 leading to a clean-up shaker I—1. The liquid from the clean-up shaker passes through pipe 77 to the starch table J—1. The drawing shows two tables J—1 and J—2 and illustrates the depositing of the starch on J—1 and the flushing of the starch from J—2. The tailings, gluten and water, from the starch table J—1, pass through pipe 78 to a gluten settler K—1 which is assumed to be filling. The gluten settler K—2 has already been filled and the gluten therein settled. The water siphoned off from the settler K—2 (gluten water) overflows into pipe 79 from which it is distributed to the pipe 24 supplying the steeping system and to the pipe 74 leading to storage tank P—2, the excess, if any, going through pipe 58 to the storage tank P—1. The gluten from settler K—2 is pressed in press F—4 and goes out of the system in moist condition (outlet *e*). The water from press F—4 passes through pipe 80 to pipe 79.

The starch on the starch tables (starch table J—2) is removed therefrom by flushing, 81 designating the flushing line and 82 the discharge pipe through which the starch passes to the washing system when, by circulation of water through pipe 81 and over the table, the desired density has been reached.

$SO_2$ may be supplied to the flushing line through pipe 83 from the sulphur tower C—2. The water for flushing is brought to the flushing line, from the starch washing system through pipe 84.

*Starch washing system.*—The starch is washed according to the method disclosed in Patent No. 1,651,611 above referred to, but, as shown, in three stages instead of two. Any number of filtering or washing operations may be employed. The flushed starch in pipe 82 is preferably heated in the heater L—2 and passes to the trough 85 of the first dehydrating and washing filter M—1. Water is extracted from the starch (first filtrate) and passes by pipe 86 to the pipe 57, leading to the starch water storage tank P—1. The layer or layers of starch on the filter are sprayed with fresh water, preferably warm water, introduced through the pipe 87. The wash water from the starch (second filtrate) passes by pipe 88 to the pipe 57 and starch water storage tank P—1. The washed starch is then discharged, as indicated by the arrow 89, into a dilution tank O—1 into which water is introduced through pipe 90. The diluted starch passes through pipe 91 to the trough 85 of the filter M—2 where it is again dehydrated, then washed, the first filtrate passing through pipe 84 to the flushing line 81 above referred to, a portion being diverted, if need be, through pipe 92 to pipe 90. The fresh water for filter M—2 is supplied through a branch 93 of pipe 87 and the wash water is discharged from this filter into a pipe 94 leading to pipe 88. The starch from filter M—2 is discharged as indicated by arrow 95 into a dilution tank O—2 supplied with fresh water through pipe 96. The diluted starch in O—2 passes through pipe 97 to the trough 85 of filter M—3. The first filtrate from M—3 passes through pipe 90 to the first dilution tank O—1. Filter M—3 is supplied with fresh water by a branch 98 of pipe 87 and the second filtrate is discharged from the filter M—3 into pipe 94 described as connected also with filter M—2. The starch discharged from filter M—3 (outlet *f*) is finished starch.

The outlets from the system referred to as "*a*", "*b*", "*c*", "*d*", "*e*", and "*f*" all discharge some water from the system since the solids discharged through outlets *b* to *f* are all in moist condition. The water issuing from the system through outlets *a* to *f* is equal to the water introduced through pipes 87 and 96 so that, under normal conditions, it is unnecessary to discharge any appreciable amount of water to the sewer.

A considerable quantity of $SO_2$ enters the wet starch system with the corn, the amount being regulated by control of the washing of the corn in the steep tanks A—2, A—3. A certain amount of $SO_2$ enters the system at the flushing and reaches the germ and coarse slop systems with the filtrates from the starch washing system. As the liquids pass through the system the $SO_2$, through evaporation and other causes, becomes depleted. The liquids are fortified with $SO_2$ in the fine slop system by use of gluten water which contains a considerable quantity of $SO_2$. Since the amount of $SO_2$ in the gluten water is substantially constant relative to the $SO_2$ concentrations maintained at the separators and at the tables, and these concentrations can be controlled, the system of operation above described permits the use of a minimum amount of $SO_2$, which is desirable not only in order to economize sulphur but also because excessive amounts of sulphurous acid have a detrimental effect on the product and are injurious to metallic parts of the apparatus.

We claim:

1. In the manufacture of starch from corn by a method comprising steeping the corn in water containing $SO_2$ and comminuting the corn, subjecting the comminuted material in water, repeatedly reused, to germ and coarse and fine slop separations, the starch and gluten to a tabling operation and the starch from the tables to a washing operation to remove solubles: the improvement which consists in returning for reuse gluten water containing $SO_2$ from the starch tables to the fine slop separation and water from the starch washing filters to the germ and coarse slop separations.

2. In the manufacture of starch from corn by a method comprising steeping the corn in water containing $SO_2$ and comminuting the corn, subjecting the comminuted material in water, repeatedly reused, to germ and coarse and fine slop separations, the starch and gluten to a tabling operation and the starch from the tables to a washing operation to remove solubles: the improvement which consists in reusing heated gluten water containing $SO_2$ from the starch tables in the fine slop separation and reusing water from the starch washing filters in the germ and coarse slop separations.

3. In the manufacture of starch from corn by a method comprising steeping and comminuting the corn, subjecting the comminuted material in water, repeatedly reused, to germ and coarse and fine slop separations, the starch and gluten to a tabling operation and the starch from the tables to a washing operation to remove solubles: the improvement which consists in returning for reuse gluten water from the starch tables to the fine slop separation and water from the starch washing filters to the germ and coarse slop separations, and introducing fresh $SO_2$ into the system only at the steeps and with the starch going to the washing operation.

RUSH O. McCOY.
OTTO A. SJOSTROM.